United States Patent [19]
Nemirovsky et al.

[11] Patent Number: 6,105,125
[45] Date of Patent: Aug. 15, 2000

[54] HIGH SPEED, SCALABLE MICROCODE BASED INSTRUCTION DECODER FOR PROCESSORS USING SPLIT MICROROM ACCESS, DYNAMIC GENERIC MICROINSTRUCTIONS, AND MICROCODE WITH PREDECODED INSTRUCTION INFORMATION

[75] Inventors: Mario Nemirovsky, San Jose; Shailaja Chenumalla, Campbell, both of Calif.

[73] Assignee: National Semiconductor Corporation, Santa Clara, Calif.

[21] Appl. No.: 08/968,976

[22] Filed: Nov. 12, 1997

[51] Int. Cl.[7] ........................................ G06F 9/30
[52] U.S. Cl. .................. 712/209; 712/210; 712/211; 712/212; 712/213; 712/245; 712/246; 712/247; 712/248
[58] Field of Search ..................... 712/208, 209, 712/210, 211, 212, 213, 245, 246, 247, 248

[56] References Cited

U.S. PATENT DOCUMENTS

| | | | |
|---|---|---|---|
| 4,206,503 | 6/1980 | Woods et al. | 711/212 |
| 4,449,184 | 5/1984 | Pohlman, III et al. | 711/2 |
| 4,484,260 | 11/1984 | Blahut et al. | 712/247 |
| 5,233,696 | 8/1993 | Suzuki | 712/204 |
| 5,568,622 | 10/1996 | Stewart et al. | 712/248 |
| 5,649,179 | 7/1997 | Steenstra et al. | 712/248 |
| 5,784,636 | 7/1998 | Rupp | 712/23 |
| 5,809,273 | 9/1998 | Favor et al. | 712/210 |
| 5,848,255 | 12/1998 | Kondo | 712/212 |
| 5,857,094 | 1/1999 | Nemirovsky | 209/166 |
| 5,896,518 | 4/1999 | Yao et al. | 712/208 |
| 6,049,862 | 4/2000 | Bauer et al. | 712/208 |

FOREIGN PATENT DOCUMENTS 0 697 650 A2   7/1995   European Pat. Off. .......... G06F 9/30

*Primary Examiner*—William M. Treat
*Attorney, Agent, or Firm*—Limbach & Limbach, LLP

[57] ABSTRACT

A microcode based decoder circuit for microprocessors that uses fast access tables to decode instructions. The pointers to the tables are generated directly from the instruction prefetch buffers. Information bits about the instruction are added to the tables at no extra cost and enable the faster decode of the instruction. The present invention includes the decode of an instruction using an entry ROM, which contains information regarding the instruction that can directly be used in generating the decoder outputs. This information is also used in selecting the correct ROM entry, thus enhancing the flexibility of the decoder, and to dynamically generate a generic microcode entry. Thus, microcode space requirements are reduced. A generic microcode instruction is used for commonly used, similar macroinstructions. This avoids duplication of microcode instructions and thus reduces the required microcode space. The invention also includes the generation of a generic microinstruction dynamically by using the predecoded information selected from the entry microcode table. This makes the generic microinstruction flexible and hence, it can be efficiently be used for many instructions. An entry microcode table, used for the efficient decode of an instruction, contains predecoded information about the instruction apart from the regular microinstruction, which is used directly to generate the decoder outputs and to select the correct microcode entry, and also for the generation of the generic microcode entry. The invention also includes accessing the entry ROM and the μROM in parallel, using the same address which is generated from the opcode and ModR/M bytes, and selecting one of their outputs. Thus the two ROMs are used efficiently in that the required time and logic are reduced.

11 Claims, 10 Drawing Sheets

02 /r          ADD r8, r/m8          Add r/m byte to byte register

OLD DECODER

ADD_02_R      Reg1 <-- ADD   Reg1, Reg2

ADD_02_M      temp <-- MRD   [Base +Disp]
              Reg1 <-- ADD   Reg1, Temp

NEW DECODER

Generic       temp <-- MRD   [Base + disp]     —— use_generic
                                               —— mem_access ADD_02        Reg1 <-- ADD   Reg1, Reg2/temp

FIG. 11

HIGH SPEED, SCALABLE MICROCODE BASED INSTRUCTION DECODER FOR PROCESSORS USING SPLIT MICROROM ACCESS, DYNAMIC GENERIC MICROINSTRUCTIONS, AND MICROCODE WITH PREDECODED INSTRUCTION INFORMATION

BACKGROUND OF THE INVENTION

1. Field of the Invention

The present invention relates to methods and apparatuses for performing high speed instruction decode within computer processors. In particular, this invention relates to a microcode based instruction decoders. Even more particularly, the present invention relates to a method and apparatus for using pipelining and parallel processing in the decode of instructions within a microprocessor.

2. Description of the Related Art

Modern microprocessors employ pipelining techniques which allow multiple, consecutive instructions to be prefetched, decoded, and executed in separate stages simultaneously. Accordingly, in any given clock cycle, a first instruction may be executed while the next (second) instruction is simultaneously being decoded, and the instruction after that one (a third instruction) is simultaneously being fetched. Since less processing is performed on each instruction per cycle, cycle time can be made shorter. Thus, while it requires several clock cycles for a single instruction to be pre-fetched, decoded, and executed, it is possible to have a processor completing instructions as fast as one instruction per cycle with a very short cycle period, because multiple consecutive instructions are in various stages simultaneously.

Typically, buffers for temporarily holding data are used to define the boundary between consecutive stages of a microprocessor pipeline. The data calculated in a particular stage is written into these buffers before the end of the cycle. When the pipeline advances upon the start of a new cycle, the data is written out of the boundary buffers into the next stage where the data can be further processed during that next cycle.

Most pipelined microprocessor architectures have at least four stages including, in order of flow, 1) a prefetch stage, 2) a decode stage, 3) an execute stage, and 4) a write-back stage. In the prefetch stage, instructions are read out of memory (e.g., an instruction cache) and stored in a buffer. Depending on the particular microprocessor, in any given cycle, the prefetch buffer may receive one to several instructions.

In the decode stage, the processor reads an instruction out of the prefetch buffer and converts it into an internal instruction format which can be used by the microprocessor to perform one or more operations, such as arithmetic or logical operations. In the execute stage, the actual operations are performed. Finally, in the write-back stage, the results of the operations are written to the designated registers and/or other memory locations.

In more complex microprocessors, one or more of the four basic stages can be further broken down into smaller stages to simplify each individual stage and even further improve instruction completion speed.

The hardware in an instruction prefetch stage typically comprises a prefetch buffer or prefetch queue which can temporarily hold instructions. Each cycle, the decode stage can take in the bytes of an instruction held in the prefetch stage for decoding during that cycle.

The hardware in a decode stage typically comprises at least a program counter and hardware for converting instructions into control lines for controlling the hardware in the execute stage. Alternately, the decode stage can include a microcode-ROM. The incoming instruction defines an entry point (i.e., an address) into the microcode-ROM at which the stored data defines the appropriate conditions for the execute stage control lines. The execute stage control data for the particular instruction may exist entirely at a single addressable storage location on the microcode-ROM or may occupy several sequentially addressable storage locations. The number of addressable storage locations in the microcode-ROM which must be accessed for a given instruction may be encoded in the instruction itself. Alternately, one or more data bits in the storage locations in the microcode-ROM may indicate whether or not another storage location should be accessed.

The control data output from the microcode-ROM is written into buffer registers for forwarding to the execute stage on the next cycle transition. The decode stage also includes hardware for extracting the operands, if any, from the instruction or from registers or memory locations and presenting the operands to the appropriate hardware in the execution stage.

Some microprocessor architectures employ what are known as variable width instruction sets. In such architectures, the instructions are not all the same width. For instance, in the instruction set for the 16/32 bit class x86 family of microprocessors developed by Intel Corporation of Santa Clara, Calif., an instruction can be anywhere from 1 to 16 bytes wide.

Some microprocessor architectures utilize a segmented address space in which the total memory space is broken down into a plurality of independent, protected address spaces. Each segment is defined by a base address and a segment limit. The base address, for instance, may be the lowest numerical address in the segment space. The segment limit defines the size of the segment. Accordingly, the end boundary of the segment is defined by the sum of the base address and the segment limit. Alternately, the base address may be the highest address and, as such, the end boundary of the segment would be the difference between the base address and the segment limit.

To generate a linear address according to the x86 architecture, at the very least two quantities are added. Particularly, the base address of the particular segment, as indicated by the segment descriptor, and an offset, indicating the distance of the desired data (i.e., instruction) from the base of the segment, must be added together. The offset itself may be comprised of up to three more parts: a base, an index and a displacement. If so, those quantities must be added to generate the offset before the offset can be added to the segment base. A more detailed discussion of segmented addressing in the x86 architecture follows but a complete discussion can be found in the *Intel486™ Microprocessor Family Proprammer's Reference Manual*, 1995, by Intel Corporation which is incorporated herein by reference.

Prior art instruction decode units in microprocessors receive instructions from the instruction prefetch unit and translate them in a two stage process into low level control signals and microcode entry points. Many but not all instructions can be decoded at a rate of one per clock cycle. Stage 1 of the decode initiates a memory access. This allows execution of a two instruction sequence which loads and operates on data in just two clock cycles. The decode unit simultaneously processes instruction prefix bytes, opcodes, ModR/M bytes, and displacements. The outputs include hardwired micro instructions to the segmentation, integer, and floating point units. The decode unit is flushed whenever the instruction prefetch unit is flushed.

FIG. 1 is a block diagram generally illustrating the various pipeline stages of a conventional microprocessor. As shown, the microprocessor is pipelined into five stages, namely: a prefetch stage, a decode stage, an execute stage, a write back stage, and a second write back stage. As shown, the prefetch stage includes two prefetch buffers 112 and 114. Prefetch buffer 112 is the line buffer from which the decode stage pulls instruction bytes. It is the only data interface between the prefetch and decode stages. The prefetch stage also includes a one kilobyte instruction cache 116 and a cache tag memory 118 for storing tag data related to the data in the instruction cache 116. The instruction cache is directly mapped with a line size 8 bytes wide. Both prefetch buffers are also 8 bytes wide, containing byte positions 0 (least significant byte) through byte position 7 (most significant byte). The prefetch stage also includes prefetch logic 120 for performing various functions relating to the control of the loading of the prefetch buffers with instructions.

Referring to FIGS. 2 and 3, the structure of instructions are briefly described. All instructions in the X86 instruction set are considered herein to be comprised of up to three subfields, each subfield adding several possible byte widths. The three possible subfields are the prefix subfield 200, the opcode subfield 210, and the constant subfield 220. Every instruction comprises at least an opcode subfield 240. The opcode subfield 210 defines the function which the execute stage is to perform with respect to that instruction (e.g., add, subtract, multiply, XOR, data movement, etc.). The opcode subfield 210 can be one, two or three bytes in length. The opcode subfield 210 will always include an opcode byte 230 defining the function to be performed. It may also include a ModR/M byte 240. The ModR/M byte 240 is an addressing mode specifier. It specifies whether an operand is in a register or memory location, and if in memory, it specifies whether a displacement, a base register, an index register and/or scaling are to be used. When the ModR/M byte 240 indicates that an index register will be used to calculate the address of an operand, the instruction may comprise a third byte, termed the scaled index byte (SIB) 250. The SIB byte 250 is included in the instruction to encode the base register, the index register and a scaling factor.

Certain instructions include a third subfield, called the constant data subfield 220, which can specify one or two operands used by the instruction. Specifically, the constant data subfield may comprise a displacement data operand 260, an immediate data operand 270, a displacement data operand 20 and an immediate data operand 270, or two immediate operands 270. When the addressing mode is one in which a displacement will be used to compute the address of an operand, the instruction includes a displacement data operand 260 as part of the constant subfield 220. A displacement data operand 260 can be one, two or four bytes in length. An immediate operand 270 directly provides the value of an operand. An immediate operand 270 may be one, two of four bytes in length.

Accordingly, the constant subfield 220, if any, can be one, two, three, four, five, six or eight bytes wide. Certain parameters, such as the segment register to be used by instructions, the address size and the operand size, are set to default conditions in the execute and/or decode stages. These parameters, however, can be overridden by prefix bytes in the prefix subfield 200 of an instruction. There are four basic types of prefix bytes, namely, an address prefix 280 for selecting between 16 or 32 byte addressing, an operand size prefix byte 285 for selecting between 16 or 32 byte data size, a segment override byte 290 which specifies the segment register an instruction should use, an instruction prefix 275 which can toggle between two states which determine the table from which the opcode byte 230 is decoded.

Accordingly, the use of the instruction prefix 275 essentially doubles the possible number of instructions. Because a popular prefix byte type, e.g., address prefix, can appear more than once in a single instruction, there can be anywhere from 0 to 14 prefix bytes in an instruction. Decoders can pull out a maximum of seven instruction bytes 200 per cycle from the line buffer 12.

Specifically, a conventional decode stage decodes, per cycle, (1) one prefix byte 200 or (2) an opcode subfield 210 (of up to three bytes) and the first operand in the constant data subfield 220 (of up to four bytes), if any, or (3) the second operand in the constant data subfield 220 (of up to four bytes). Accordingly, using a conventional decoder an instruction which has two operands in its constant data subfield 220 requires at least two cycles to be executed and possibly more if the instruction has any prefix bytes. What is needed is a decoder that can decode in fewer cycles.

The information encoded in an instruction includes a specification of the operation to be performed, the type of the operands to be manipulated, and the location of these operands. If an operand is located in memory, the instruction also must select, explicitly or implicitly, the segment which contains the operand.

As indicated above, an instruction may have various parts with different functions. The following section describes the function of the different parts of an instruction in more detail than the previous section. However, a complete description of the precise function of the parts of instructions is described in Appendix A of the *Intel486™ Processor Family Programmer's Reference Manual*. Of these parts, only the opcode is always present as indicated above. The other parts may or may not be present, depending on the operation involved and the location and type of the operands. The function of the different parts of an instruction are listed below:

Prefixes 200: one or more bytes preceding an instruction which modify the operation of the instruction. The following prefixes can be used by application programs:
1. Segment override 290—explicitly specifies which segment register an instruction should use, instead of the default segment register.
2. Address size 280—switches between 16- and 32-bit addressing. Either size can be the default; this prefix selects the non-default size.
3. Operand size 285—switches between 16- and 32-bit data size. Either size can be the default; this prefix selects the non-default size.
4. Repeat or instruction prefix 275—used with a string instruction to cause the instruction to be repeated for each element of the string or used to increase the number of possible instructions.

Opcode 230: specifies the operation performed by the instruction. Some operations have several different opcodes, each specifying a different form of the operation.

Register specifier 230, 240: an instruction may specify one or two register operands. Register specifiers occur either in the same byte as the opcode or in the same byte as the addressing-mode specifier.

Addressing-mode specifier 240: when present, specifies whether an operand is a register or memory location; if in memory, specifies whether a displacement, a base register, an index register, and scaling are to be used.

SIB 250 (scale, index, base) byte: when the addressing-mode specifier indicates an index register will be used to calculate the address of an operand, a SIB byte is included in the instruction to encode the base register, the index register, and a scaling factor.

Displacement 260: when the addressing-mode specifier indicates a displacement will be used to compute the address of an operand, the displacement is encoded in the instruction. A displacement is a signed integer of 32, 16, or 8 bits. The 8-bit form is used in the common case when the displacement is sufficiently small. The processor extends an 8-bit displacement to 16 or 32 bits, taking into account the sign.

Immediate operand 270: when present, directly provides the value of an operand. Immediate operands may be bytes, words, or doublewords. In cases where an 8-bit immediate operand is used with a 16- or 32-bit operand, the processor extends the eight-bit operand to an integer of the same sign and magnitude in the larger size. In the same way, a 16-bit operand is extended to 32-bits.

An instruction acts on zero or more operands. An example of a zero-operand instruction is the NOP instruction (no operation). An operand can be held in any of these places: in the instruction itself (an immediate operand); in a register (in the case of 32-bit operands, EAX, EBX, ECX, EDX, ESI, EDI, ESP, or EBP; in the case of 16-bit operands AX, BX, CX, DX, SI, DI, SP, or BP; in the case of 8-bit operands AH, AL, BH, BL, CH, CL, DH, or DL; the segment registers; or the EFLAGS register for flag operations). Use of 16-bit register operands requires use of the 16-bit operand size prefix (a byte with the value 67H preceding the instruction); in memory; or at an I/O port.

Access to operands is very fast. Register and immediate operands are available on-chip—the latter because they are prefetched as part of interpreting the instruction. Memory operands residing in the on-chip cache can be accessed just as fast.

Of the instructions which have operands, some specify operands implicitly; others specify operands explicitly; still others use a combination of both. For example:
Implicit operand: AAM
By definition, AAM (ASCII adjust for multiplication) operates on the contents of the AX register.
Explicit operand: XCHG EAX, EBX
The operands to be exchanged are encoded in the instruction with the opcode.
Implicit and explicit operands: PUSH COUNTER
The memory variable COUNTER (the explicit operand) is copied to the
top of the stack (the implicit operand).

Note that most instructions have implicit operands. All arithmetic instructions, for example, update the EFLAGS register An instruction can explicitly reference one or two operands. Two-operand instructions, such as MOV, ADD, and XOR, generally overwrite one of the two participating operands with the result. This is the difference between the source operand (the one unaffected by the operation) and the destination operand (the one overwritten by the result).

For most instructions, one of the two explicitly specified operands—either the source or the destination—can be either in a register or in memory. The other operand must be in a register or it must be an immediate source operand. This puts the explicit two-operand instructions into the following groups: Register to register, Register to memory, Memory to register, Immediate to register, and Immediate to memory.

Certain string instructions and stack manipulation instructions, however, transfer data from memory to memory. Both operands of some string instructions are in memory and are specified implicitly. Push and pop stack operations allow transfer between memory operands and the memory-based stack.

Several three-operand instructions are provided, such as the IMUL, SHRD, and SHLD instructions. Two of the three operands are specified explicitly, as for the two-operand instructions, while a third is taken from the ECX register or supplied as an immediate. Other three-operand instructions, such as the string instructions when used with a repeat prefix, take all their operands from registers.

Certain instructions use data from the instruction itself as one (and sometimes two) of the operands. Such an operand is called an immediate operand. It may be a byte, word, or doubleword. For example:
SHR PATTERN, 2
One byte of the instruction holds the value 2, the number of bits by which to shift the variable PATTERN.
TEST PATTERN, 0FFFF00FFH
A doubleword of the instruction holds the mask which is used to test the variable PATTERN.
IMUL CX, MEMWORD, 3
A word in memory is multiplied by an immediate 3 and stored into the CX register.

All arithmetic instructions (except divide) allow the source operand to be an immediate value. When the destination is the EAX or AL register, the instruction encoding is one byte shorter than with the other general registers.

Operands may be located in one of the 32-bit general registers (EAX, EBX, ECX, EDX, ESI, EDI, ESP, or EBP), in one of the 16-bit general registers (AX, BX, CX, DX, SI, DI, SP, or BP), or in one of the 8-bit general registers (AH, BH, CH, DH, AL, BL, CL, or DL).

The processor has instructions for referencing the segment registers (CS, DS, ES, SS, FS, and GS). These instructions are used by application programs only if system designers have chosen a segmented memory model.

The processor also has instructions for changing the state of individual flags in the EFLAGS register. Instructions have been provided for setting and clearing flags which often need to be accessed. The other flags, which are not accessed so often, can be changed by pushing the contents of the EFLAGS register on the stack, making changes to it while it's on the stack, and popping it back into the register.

Instructions with explicit operands in memory must reference the segment containing the operand and the offset from the beginning of the segment to the operand. Segments are specified using a segment-override prefix, which is a byte placed at the beginning of an instruction. If no segment is specified, simple rules assign the segment by default. The offset is specified in one of the following ways:

Most instructions which access memory contain a byte for specifying the addressing method of the operand. The byte, called the ModR/M byte, comes after the opcode and specifies whether the operand is in a register or in memory. If the operand is in memory, the address is calculated from a segment register and any of the following values: a base register, an index register, a scaling factor, and a displacement. When an index register is used, the ModR/M byte also is followed by another byte to specify the index register and scaling factor. This form of addressing is the most flexible.

A few instructions use implied address modes:

A MOV instruction with the AL or EAX register as either source or destination can address memory with a doubleword encoded in the instruction. This special form of the MOV instruction allows no base register, index register, or scaling factor to be used. This form is one byte shorter than the general-purpose form.

String operations address memory in the DS segment using the ESI register, (the MOVS, CMPS, OUTS, and LODS instructions) or using the ES segment and EDI register (the MOVS, CMPS, INS, SCAS, and STOS instructions).

Stack operations address memory in the SS segment using the ESP register (the PUSH, POP, PUSHA, PUSHAD, POPA, POPAD, PUSHF, PUSHFD, POPF, POPFD, CALL, LEAVE, RET, IRET, and IRETD instructions, exceptions, and interrupts).

The ModR/M byte provides the most flexible form of addressing. Instructions which have a ModR/M byte after the opcode are the most common in the instruction set. For memory operands specified by a ModR/M byte, the offset within the selected segment is the sum of three components: A displacement+A base register+An index register (the index register may be multiplied by a factor of 2, 4, or 8). The offset which results from adding these components is called an effective address. Each of these components may have either a positive or negative value.

The displacement component, because it is encoded in the instruction, is useful for relative addressing by fixed amounts, such as: location of simple scalar operands, beginning of a statically allocated array, and offset to a field within a record.

The base and index components have similar functions. Both use the same set of general registers. Both can be used for addressing which changes during program execution, such as: location of procedure parameters and local variables on the stack, the beginning of one record among several occurrences of the same record type or in an array of records, the beginning of one dimension of multiple dimension array, or the beginning of a dynamically allocated array.

The uses of general registers as base or index components differ in the following respects: the ESP register cannot be used as an index register. When the ESP or EBP register is used as the base, the SS segment is the default selection. In all other cases, the DS segment is the default selection.

The scaling factor permits efficient indexing into an array when the array elements are 2, 4, or 8 bytes. The scaling of the index register is done in hardware at the time the address is evaluated. This eliminates an extra shift or multiply instruction.

The base, index, and displacement components may be used in any combination; any of these components may be null. A scale factor can be used only when an index also is used. Each possible combination is useful for data structures commonly used by programmers in high level languages and assembly language. Suggested uses for some combinations of address components are described below.

The displacement alone indicates the offset of the operand. This form of addressing is used to access a statically allocated scalar operand. A byte, word, or doubleword displacement can be used. The offset to the operand is specified indirectly in one of the general registers, as for "based" variables.

A register and a displacement can be used together for two distinct purposes. First, index into static array when the element size is not 2, 4, or 8 bytes. The displacement component encodes the offset of the beginning of the array. The register holds the results of a calculation to determine the offset to a specific element within the array. Second, access a field of a record. The base register holds the address of the beginning of the record, while the displacement is an offset to the field.

An important special case of this combination is access to parameters in a procedure activation record. A procedure activation record is the stack frame created when a subroutine is entered. In this case, the EBP register is the best choice for the base register, because it automatically selects the stack segment. This is a compact encoding for this common function.

(INDEX*SCALE)+DISPLACEMENT. This combination is an efficient way to index into a static array when the element size is 2, 4, or 8 bytes. The displacement addresses the beginning of the array, the index register holds the subscript of the desired array element, and the processor automatically converts the subscript into an index by applying the scaling factor.

BASE+INDEX+DISPLACEMENT. Two registers used together support either a two-dimensional array (the displacement holds the address of the beginning of the array) or one of several instances of an array of records (the displacement is an offset to a field within the record).

BASE+(INDEX*SCALE)+DISPLACEMENT. This combination provides efficient indexing of a two-dimensional array when the elements of the array are 2, 4, or 8 bytes in size.

Once again, all instruction encodings are subsets of the general instruction format shown in FIG. 2. Instructions consist of optional instruction prefixes, one or two primary opcode bytes, possibly an address specifier consisting of the ModR/M byte and the SIB (Scale Index Base) byte, a displacement, if required, and an immediate data field, if required.

Smaller encoding fields can be defined within the primary opcode or opcodes. These fields define the direction of the operation, the size of the displacements, the register encoding, or sign extension; encoding fields vary depending on the class of operation.

Most instructions that can refer to an operand in memory have an addressing form byte following the primary opcode byte(s). This byte, called the ModR/M byte, specifies the address form to be used as indicated above. Certain encodings of the ModR/M byte indicate a second addressing byte, the SIB (Scale Index Base) byte, which follows the ModRIM byte and is required to fully specify the addressing form.

Addressing forms can include a displacement immediately following either the ModR/M or SIB byte. If a displacement is present, it can be 8-, 16- or 32-bits.

If the instruction specifies an immediate operand, the immediate operand always follows any displacement bytes. The immediate operand, if specified, is always the last field of the instruction.

The following are the allowable instruction prefix codes:

F3H REP prefix (used only with string instructions)

F3H REPE/REPZ prefix (used only with string instructions)

F2H REPNE/REPNZ prefix (used only with string instructions)

F0H LOCK prefix

The following are the segment override prefixes:

2EH CS segment override prefix

36H SS segment override prefix

3EH DS segment override prefix

26H ES segment override prefix
64H FS segment override prefix
65H GS segment override prefix
66H Operand-size override
67H Address-size override The ModR/M and SIB bytes follow the opcode byte(s) in many of the processor instructions. They contain the following information:

The indexing type or register number to be used in the instruction

The register to be used, or more information to select the instruction

The base, index, and scale information

FIG. 3 shows the formats of the ModR/M and SIB bytes. The values and the corresponding addressing forms of the ModR/M and SIB bytes are shown in Tables 27-2, 27-3, and 27-4 of the *Intel486™ Processor Family Programmer's Reference Manual*. The 16-bit addressing forms specified by the ModR/M byte are in Table 27-2 of the same manual. The 32-bit addressing forms specified by the ModR/M byte are in Table 27-3 of the same manual. Table 27-4 of the same manual shows the 32-bit addressing forms specified by the SIB byte.

The ModR/M byte 240A contains three fields of information:

The mod field 242, which occupies the two most significant bits of the byte, combines with the R/M field to form 32 possible values: eight registers and 24 indexing modes.

The reg field 244, which occupies the next three bits following the mod field, specifies either a register number or three more bits of opcode information. The meaning of the reg field is determined by the first (opcode) byte of the instruction.

The R/M field 246, which occupies the three least significant bits of the byte, can specify a register as the location of an operand, or can form part of the addressing-mode encoding in combination with the mod field as described above.

The based indexed and scaled indexed forms of 32-bit addressing require the SIB byte 250A. The presence of the SIB byte is indicated by certain encodings of the ModR/M byte. The SIB byte then includes the following fields:

The ss field 252, which occupies the two most significant bits of the byte, specifies the scale factor.

The index field 254, which occupies the next three bits following the ss field and specifies the register number of the index register.

The base field 256, which occupies the three least significant bits of the byte, specifies the register number of the base register.

FIG. 4 is high level block diagram of the decode stage of a conventional microprocessor. The line buffer 112 is shown at the top of the diagram. The decode stage pulls instructions for decoding only out of the line buffer 112. Accordingly, line buffer 112 is the data interface between the prefetch stage and the decode stage. The prefetch buffer is a 16 byte circular buffer. The decode stage pulls instructions bytes out of byte positions in the line buffer 112 as dictated by a series of instruction pointers generated by instruction pointer generating circuits 1100.

The instruction pointers include a demand-instruction pointer (DIP), a temporary instruction pointer (TIP), an opcode length pointer (TIPOPLEN), and a shift pointer (TIPSHIFT). The DIP is generated each clock cycle to point to the linear address of the first byte of the instruction currently being operated on by the decode stage. The three least significant bytes of the DIP identify the particular byte position in the line buffer at which that first instruction byte exists (because the buffer width is 8 or $2^3$ bytes).

The TIP is generated each cycle to point to the first byte of the instruction which has not yet been consumed by the decode stage. The three LSB's of the TIP point to the byte position in the line buffer 112 of the first byte of the instruction which has not yet been consumed. The TIP will be the same as the DIP at the beginning of an instruction. The TIP OPLEN pointer is set to the sum of the TIP pointer and the opcode length so that it points to the first byte of constant data. The three LSB's of the DIPOLEN point to the byte position in the line buffer 112 of the first byte of constant data, if any of the instruction.

The TIPSHIFT pointer points to the address to which the TIP will be updated when the decode stage consumes bytes. The three LSB's of the TIPSHIFT point to a byte position in the line buffer of the byte to which the TIP will be updated. TIPSHIFT is controlled by one of the following depending on the portion of an instruction that is currently being operated on by the decode stage. Particularly, TIPSHIFT will be (1) 1, (2) the TIP pointer plus the length of the opcode subfield in the first operand, if any, of the instruction currently in the decode stage, or (3) the TIP pointer plus the length of the second operand of the instruction currently in the decode stage.

In the terminology of this specification, bytes are "consumed" by the decode stage when they are passed through the data instruction circuits 1102 and 1104 to the opcode assembly circuit 1106 and/or constant data ports 1108, 1110 and 1112, where they are either decoded or stored in shadow registers as described more fully below. If an instruction has any prefix bytes, they are consumed one per cycle. All opcode bytes as well as all bytes of the first operand in the constant subfield, if any, are consumed simultaneously in one cycle following the decoding of the last prefix byte. If there is a second operand in the constant subfield, all of its bytes are consumed simultaneously in one subsequent cycle.

The conventional decode stage comprises an opcode data instruction circuit 1102. It is an eight byte to three byte instruction circuit period. It takes in all eight bytes from the line buffer 112 and selects the byte position in the line buffer pointed to by the TIP pointer and the following bytes in a circular Q fashion. The conventional opcode instruction circuit 1102 includes circuitry for determining if the first byte pointed to by the TIP pointer is an opcode byte or a prefix byte. If it is a prefix byte and it is tagged valid, it is forwarded to opcode assembly circuit 1106, where it is directed into prefix decoding logic circuit 1116. Control decode logic 1116 sets a flag in prefix flag register 1114 corresponding to the information conveyed by the prefix byte. If the byte position in the line buffer 112 pointed to by the TIP is not tagged valid, the decode stage simply stalls until a subsequent cycle in which it is tagged valid.

The above background describes a conventional decode circuit for microprocessors. In the quest for a greater processor speed, it is an object of the present invention to further increase the number of instructions decoded per cycle.

It is a further object of the present invention to increase the performance of the decode stage in such a modular manner that the improvement is flexible and scaleable, i.e., by adding width or depth to the number of instructions that can be handled simultaneously (via parallelling or pipelining the decode stage). In other words, it is a further object of the present invention to allow scaling of the system in that multiple decoders can be added to increase performance through parallel processing.

It is a further object of the present invention to fine tune the complete behavior of every instruction in the instruction set for maximum performance, faster decode and more efficient decode of the instruction.

It is a further object of the present invention to increase the decoder's performance without significantly increasing the memory requirements of the decode stage.

It is a further object of the present invention to increase the decoder's performance in a flexible and scaleable manner without significantly increasing the complexity of the decode stage and without adding extra cost to the system.

It is a further object of the present invention to maximize performance of the decode of memory operand instructions that do not behave in a manner similar to the register operand instructions.

SUMMARY OF THE INVENTION

The present invention is a microcode based decoder circuit for microprocessors. The microcode based decoder uses a fast access table, in parallel with a conventional microcode-ROM ($\mu$ROM), to decode instructions. In a preferred embodiment, the pointer to the table is given by the opcode, group bits and two byte opcode bit. Using this pointer enables fast access of the fast access table. The fast access table, called the Entry ROM (eROM) table, consists of information bits about the opcode apart from the first micro instruction. These bits are added to the table at no extra cost and they enable the faster decode of the instruction. These bits also indicate whether the opcode has a ModR/M byte. In that case, the ModR/M byte extracted from the byte extractor is validated and provides an entry to another lookup table called the ModR/M table. The ModR/M table contains the addressing mode information and indicates if the particular instruction requires a memory access.

In addition, the ModR/M table indicates if the instruction includes the scaled index form of addressing mode. In the case that it does, the SIB byte from the byte extractor is validated. The SIB byte provides an entry into a third lookup table called the SIB table. As soon as the instruction has been extracted from the prefetch buffer, the three tables, eROM, ModR/M and SIB, together simultaneously provide the instruction length, the addressing mode, the source and destination registers and other information directly.

The behavior of instructions that use memory operands versus those that use register operands is different. This difference lies in the first microinstruction to be executed, which is similar for most of the instructions with memory operands. One unique feature of the decoder of the present invention is that it allows sharing of microinstructions by the use of a "generic microinstruction." The generic microinstruction is a single microinstruction. It makes efficient use of the similarity in the behavior of the instructions with memory operands. This allows the sharing of a microinstruction by all of the instructions with memory operands. Its usage and behavior is controlled by the information bits in the eROM table. Specifically, it is controlled by the "use_generic" bit generated by the eROM table. This avoids redundancy and saves microcode space.

Though many memory based instructions behavior similarly, some of them do not. To cover this wider range of instructions, flexibility is provided by accessing both the eROM and $\mu$ROM simultaneously. Based upon the information bits generated from the eROM table, only one of the eROM or $\mu$ROM is selected. Also, the information bits in the eROM table indicate whether the generic microinstruction can be used or not. This feature covers the rest of the instructions which do not have similar behavior in the case of the memory operand. Thus, the complete behavior of every instruction of the instruction set can be fine tuned for maximum performance and faster and more efficient decode of the instruction. As mentioned above, the faster and more efficient decode of the instruction is possible by using the predecoded information in the eROM and ModR/M tables and the generic microinstruction.

As stated above, the generic microinstruction allows sharing of a microinstruction between instructions which use a memory operand. To be able to handle all of the instructions in the microprocessor instruction set, several generic instructions would be needed. Having to use several microinstructions would eliminate the benefits of using only a few generic microinstructions.

In addition, if multiple generic microinstructions were used they would differ only by one field. To reduce the number of entries in the generic $\mu$ROM to only one, and thus enable faster access, some information bits, called "generic_memop" in the eROM table, are used to indicate the correct field. Thus, a generic microinstruction is generated dynamically using the information from the Entry ROM.

The opcode of an instruction points to an entry point in the eROM. This eROM not only consists of the first microinstruction to be executed, but also the predecoded information about the opcode. In other words, the eROM table includes a list of all of the possible first microinstructions plus predecoded information about the opcode. Included in this predecoded information is the "use_generic" bit which controls the use of the generic PROM and its dynamic generation. In addition to that, the eROM table can generate another bit signal called "use_$\mu$ROM" which is used to select one of the two ROM entries. These bits are added with no extra cost to the system and they enable fast decode which results in better efficiency.

Though some memory operand instructions behave similar to the register operand instructions, some do not. To maximize performance of the decode for these type of instructions, split $\mu$ROM access is used. Split $\mu$ROM access means that both ROMs, the $\mu$ROM and the eROM are accessed simultaneously by the same address. The relevant entry is selected using the information bits from the eROM. This feature allows scaling of the system in that multiple pairs of $\mu$ROM and eROM tables can be added to increase performance through parallel processing.

Thus, a decoder of the present invention is used for decoding instructions in a processor and for providing a microcode to a sequencer. The present invention includes a line buffer that receives instruction and associated operands to be decoded from the previous pipeline stage. An extractor circuit, connected to the buffer, is included to read portions of the instruction from the buffer. A first memory is used to implement the eROM table. The eROM is connected to the extractor circuit to receive portions of the instruction. It includes an entry for each instruction. The eROM also includes several output signals. The output signals specify at least (1) a microcode bit pattern for the sequencer, (2) a set of information, in the form of "Infobits", about the instruction being decoded, and (3) the existence of a primary addressing mode specifier in the instruction.

The decoder of the present invention can also further include a second memory that implements the ModR/M table ROM. The ModR/M ROM is coupled to the eROM output signal that specifies that a primary addressing mode is being used in the instruction being decoded. The ModR/M ROM is also coupled to the extractor circuit in parallel with the eROM, to receive portions of the instruction. The ModR/M includes output signals that specify additional "Infobits" about the instruction and the existence of a secondary addressing mode specifier in the instruction.

The decoder of the present invention can also further include a third memory that implements the SIB table. The SIB ROM is connected to the ModR/M ROM output signal that specifies that a secondary addressing mode is in use in the instruction being decoded. As with the other memories, the SIB ROM is also connected to the extractor circuit in parallel. It can thus also receive portions of the instruction and it includes output signals that specify a third additional set of information about the instruction.

Finally, the present invention preferably includes several additional components: a selection logic circuit, a generic ROM, a µROM, a latch register, and a size logic circuit. The selection logic circuit includes an output coupled to the sequencer. It also includes several microcode bit pattern inputs. Each of the inputs are connected to different microcode outputs of the other components. The eROM, the generic ROM, the FROM, and the latch register all have outputs connected to the selection logic inputs. Based on the "Infobits", the selection logic circuit is selects a microcode bit pattern for the sequencer from among the various inputs.

The generic ROM includes the generic microinstruction bit pattern for the sequencer that is common to a subset of all the instructions as described above. Alternatively, a dynamic generic ROM can be used. The dynamic generic ROM includes a bit pattern common to a larger subset of the instructions. Part of the bit pattern is dynamically defined by the "Infobits" from the memories.

The latch register has an input that can be connected to the microcode bit pattern output of the eROM or the output of the µROM. The input is selected based upon "Infobits" from the eROM.

Finally, the size logic circuit is for calculating the length of the instruction based upon the "Infobits" from the memories that contain this information.

BRIEF DESCRIPTION OF THE DRAWINGS

FIG. 11 is an example code sequence comparing the functioning of microcode based decoder using a generic instruction according to the present invention versus the functioning of a prior art decoder.

DETAILED DESCRIPTION OF THE PREFERRED EMBODIMENTS

Figure 5:
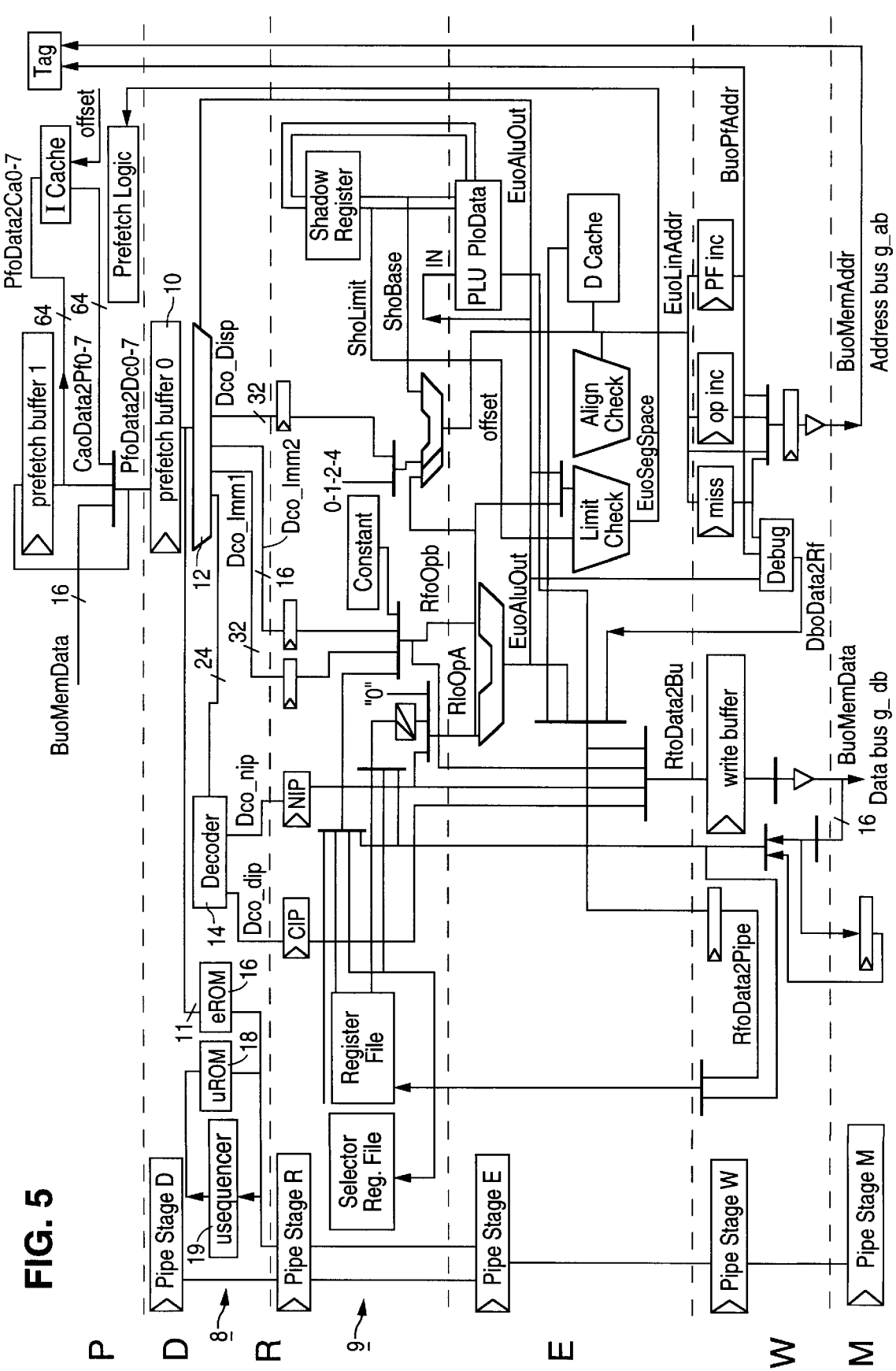
FIG. 5 is a high level architectural diagram of the microprocessor using a microcode based decoder of the present invention.

Turning to FIG. 5, a preferred embodiment of the present invention includes a microcode based decoder circuit stage 8 for microprocessors. The microcode based decoder circuit stage 8 includes a sixteen byte circular prefetch buffer 10 accessible by an opcode byte extractor 12. The byte extractor 12 is connected to the Register stage 9 via three data paths. The first two data paths are 32 bits wide and convey the displacement and the immediate operands respectively to the register stage. The third data path is 16 bits wide and carries the immediate2 operand. The opcode byte extractor 12 is connected to the decoder 14 by a 24 bit wide data path. The decoder circuit stage 8 also includes a fast access table to decode instructions called the EntryROM (eROM) 16. The eROM 16 is accessed using 11 bits from the prefetch buffer 10. The decoder circuit stage 8 uses a MicroROM (µROM) 18 to drive a MicroSequencer (µSequencer) 19 to control the various parts of the processor.

Figure 6:
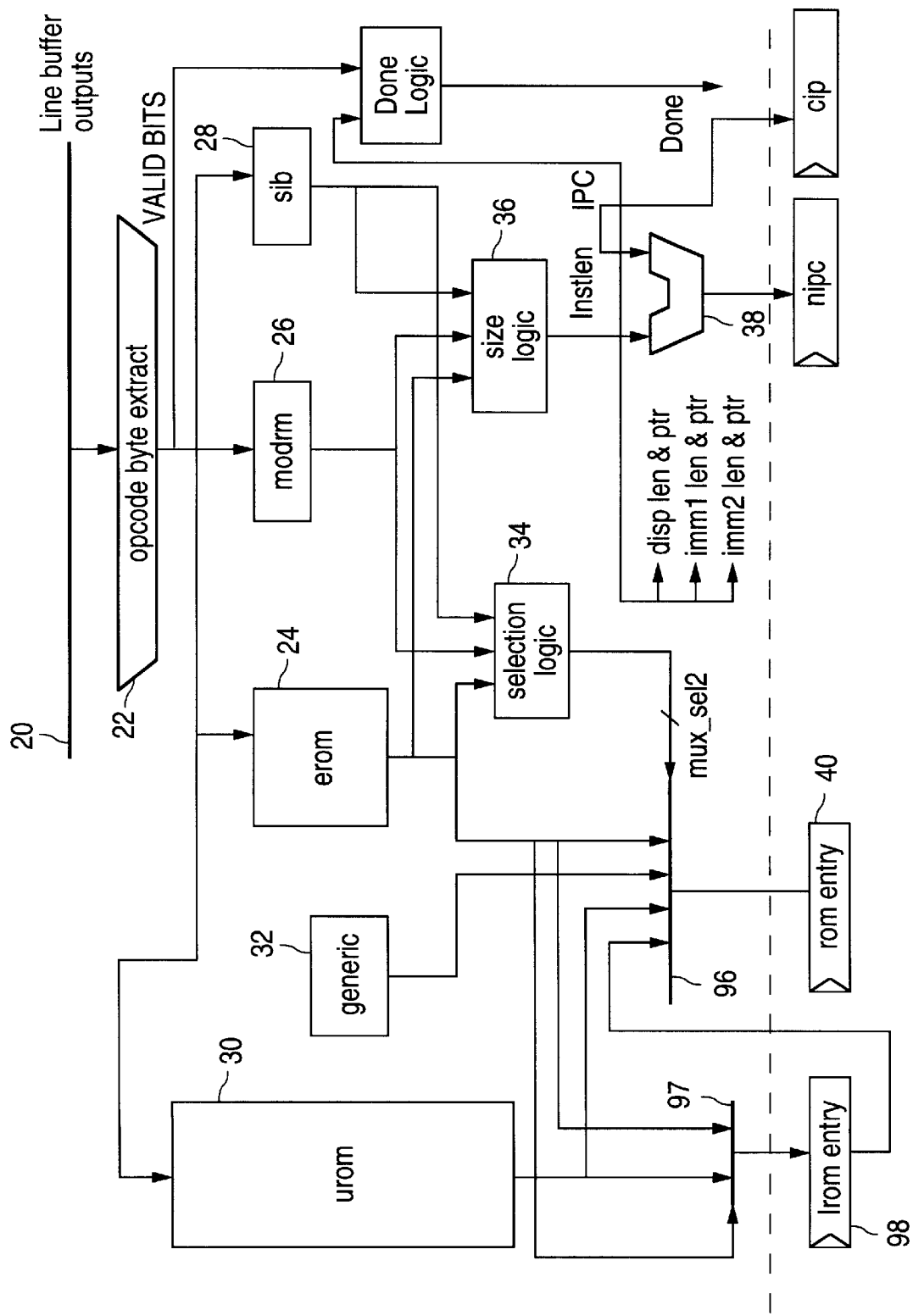
FIG. 6 is a high level decoder block diagram of the microcode based decoder of the present invention.

FIG. 6 provides a more detailed view of the preferred embodiment of the decoder of the present invention. The opcode byte extractor 22 uses a pointer to the start of an instruction in the sixteen byte circular prefetch buffer 20 to access the first three bytes of the instruction. Thus, the first 24 bits of the instruction to be decoded are immediately available to the eROM table 24, the ModR/M table 26, the SIB table 28, and the µROM 30. The decoder 14 pictured in FIG. 5 is comprised of the ModR/M table 26, the SIB table 28, the selection logic 34, the size logic 36, the arithmetic logic unit (ALU) 38, and the generic microinstruction generator 32.

Using pointers generated directly from only the first three bytes of the instruction definition, simultaneous lookups are performed in the eROM table 24, the ModR/M table 26, and the SIB table 28 to quickly determine everything about the instruction the processor needs to know to perform the instruction's functions and access the instruction's operands. Via the selection logic 34 and the size logic 36, this information in the form of Information bits (infobits) is used to compile a microinstruction for ROM entry 40 and calculate the pointers and length parameters that the processor needs to execute the microinstruction.

The µROM 30 which contains the microinstructions for all possible instructions also has simultaneous access to the first three bytes of the instruction. The eROM table 24 also contains the first microinstruction for the possible instructions that are decoded and can generate a microinstruction for ROM entry 40 when an infobit use_µROM is set low. The generic ROM 32 is a single microinstruction wide memory that is used whenever possible as a repository for assembling the bits common to multiple opcodes. To cover a broader range of opcodes, some of the infobits generated by the eROM table 24 are used to dynamically create the generic ROM's instruction.

Figure 7:
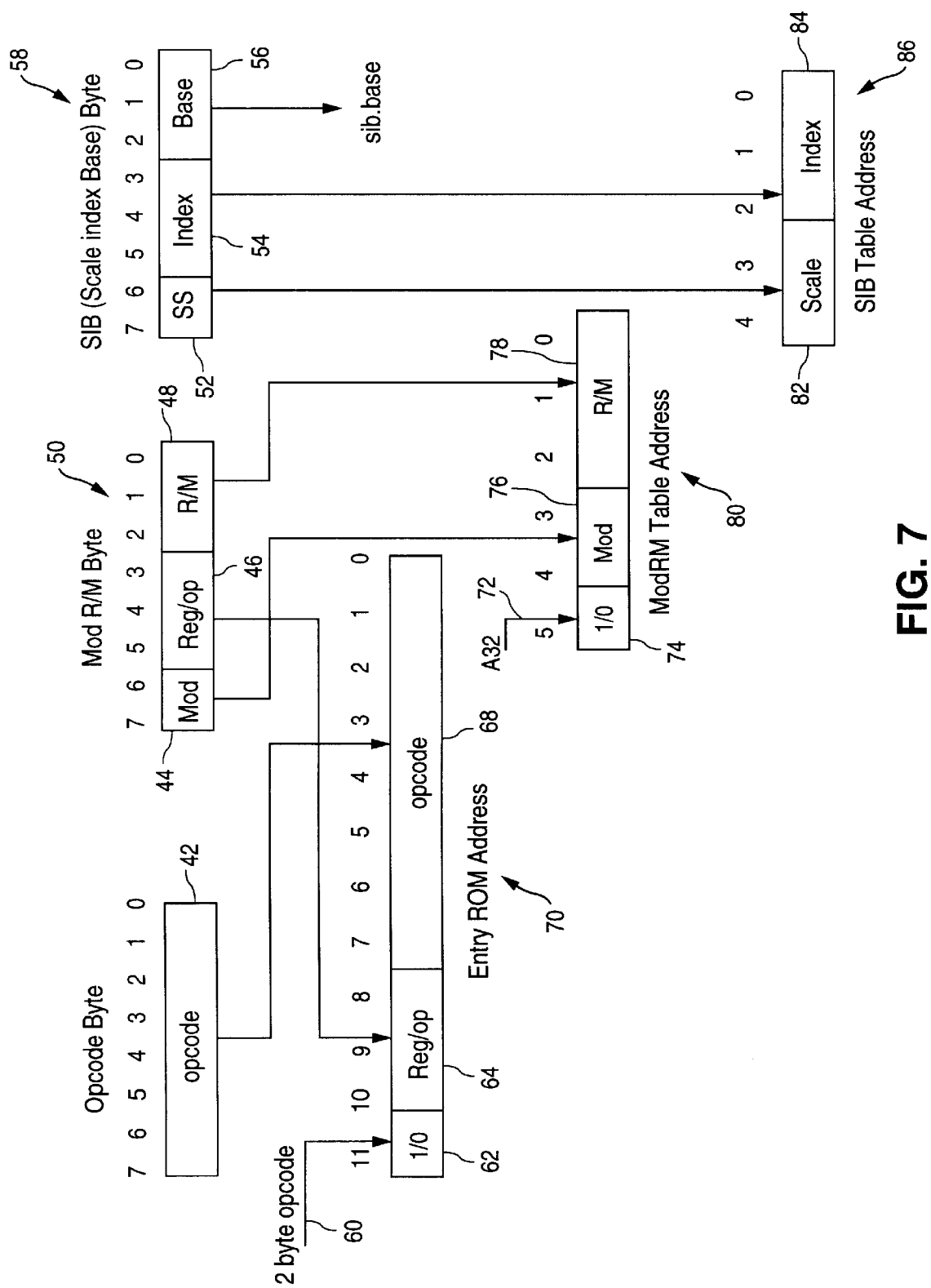
FIG. 7 is a block diagram depicting the address generation process used in the decoder of the present invention.

Turning to FIG. 7, the pointer to the eROM table 24 of FIG. 6 is given by the opcode 42, the group bits 46 and a "two byte opcode" bit 60. More specifically, the first byte of the instruction (called the opcode byte 42), the three "Register or Opcode bits" (Reg/Op bits) 46 (which are the fifth, fourth and third bits of the next byte (the ModR/M byte 50) of the instruction), and the "two byte opcode" bit 60 are used as an address into the eROM table 24 of FIG. 6. This enables fast access of the table. The "2 byte opcode" signal 60 is generated by reading the prefix bytes directly from the prefetch buffer 10 during the clock cycle immediately preceding the cycle in which decode is performed. If the prefix bytes are OFH, then the "2 byte opcode" is set to "1" meaning that the Two-Byte Opcode Map should be used in the eROM as opposed to the One-Byte Opcode Map. As mentioned in the Background section above, use of this bit essentially doubles the number of opcodes that the processor can support.

The eROM table 24 of FIG. 6 includes a subset of infobits about the opcode 42 in addition to the first microinstruction. These infobits are added to the eROM table 24 at no extra cost and they enable faster decode of the instruction. These infobits also indicate whether the opcode 42 has a ModR/M byte 50. In the case that it exists, the ModRNM byte 50 extracted from the byte extractor 22 of FIG. 6, is validated and the ModR/M table address 80 provides an entry into a secondary table called the ModR/M table 26 of FIG. 6 discussed above.

The ModR/M table address 80 is formed from the two Mod bits 44 (the seventh and sixth bits in the ModR/M byte), the three R/M bits 48 (the second, first and zero bits in the ModR/M byte), and a signal called the "a32" bit 72 XORed with the "a32 overwrite" bit. The decoder 14 is fed a signal called the "machine state status bit", also called the "a32" bit. This signal defines the configuration of the processor. Specifically this bit indicates whether the machine has been programmed to run in a sixteen or thirty-two bit mode.

Figure 1:
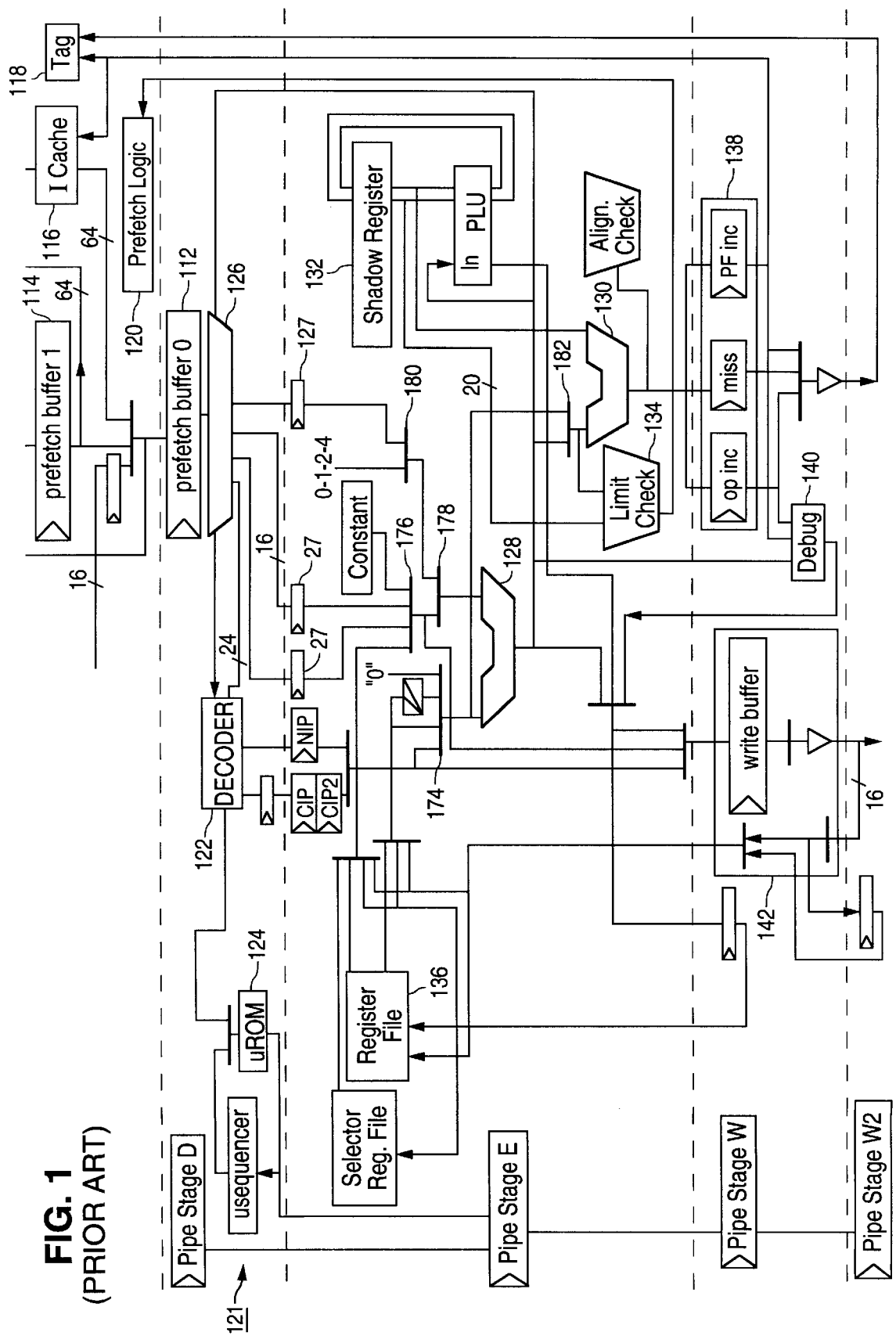
FIG. 1 is a high level block diagram of a pipelined microprocessor of the prior art.
Figure 2:
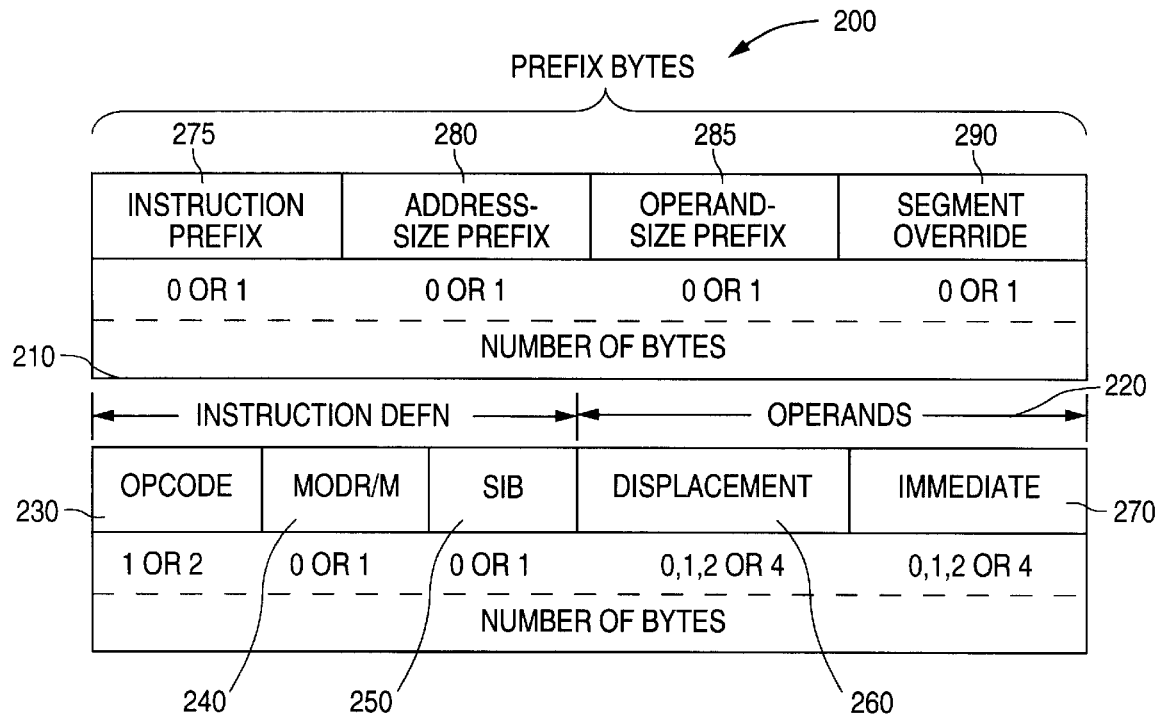
FIG. 2 is a block diagram illustrating the various possible subfields and individual bytes of an instruction used in a microprocessor.
Figure 3:
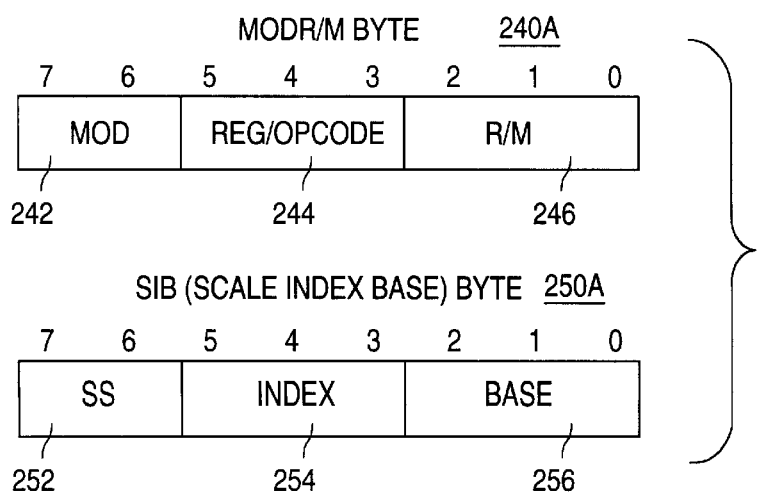
FIG. 3 is a block diagram illustrating the ModR/M and SIB subfields and individual bits of an instruction used in a microprocessor.
Figure 4:
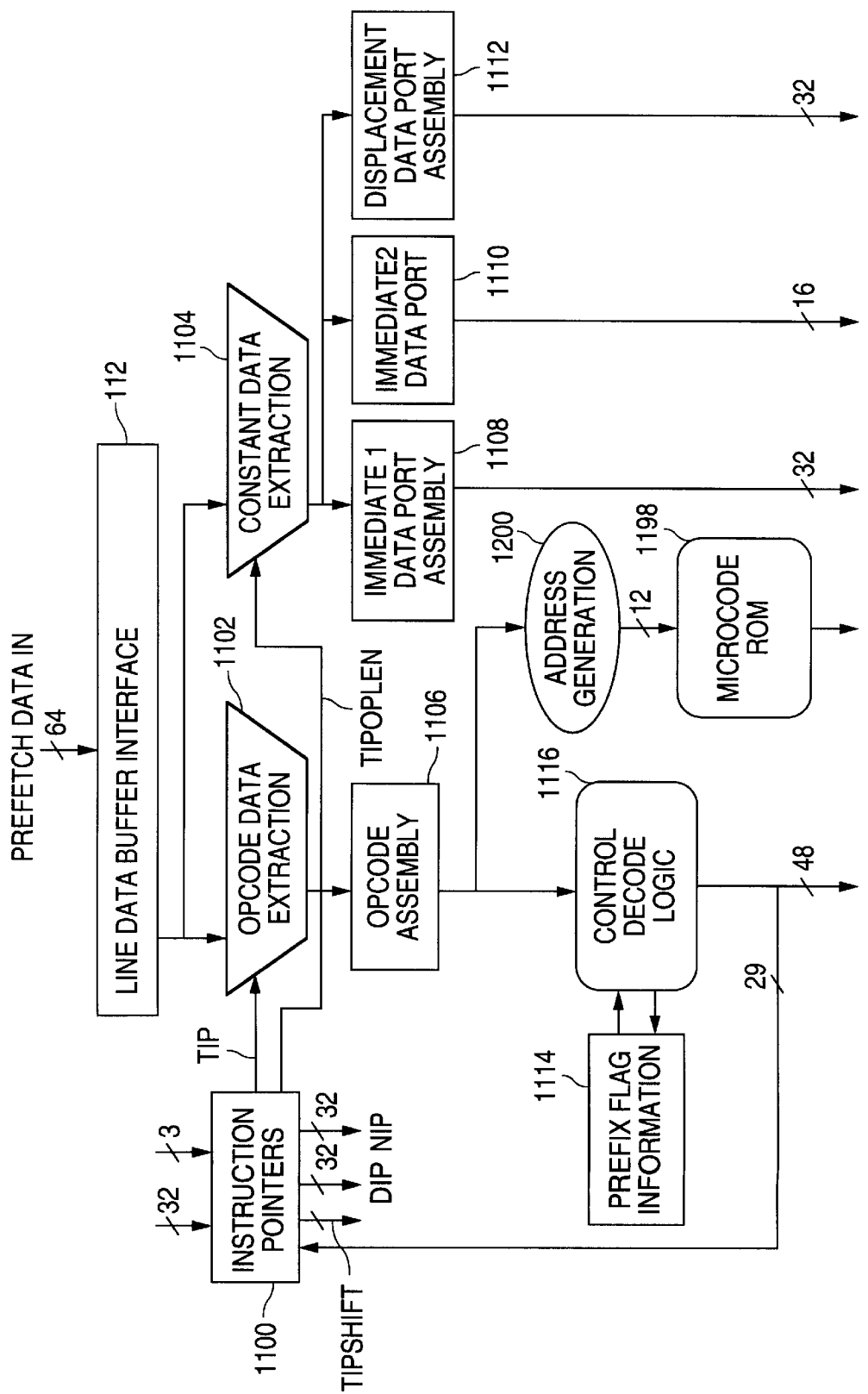
FIG. 4 is a high level block diagram of the decode stage of a microprocessor of the prior art.

Instructions can include prefixes that will allow the machine configuration to be temporarily changed to a desired mode. In other words, prefixes can be used to allow a processor configured as a thirty-two bit machine to execute instructions as sixteen bit instructions for example. The "machine state status bit" 72 is a preprogrammed constant but can be modified by XORing it with the "a32 overwrite" bit contained in the prefix bytes (shown in FIG. 3) read directly from the prefetch buffer 10 during the clock cycle immediately preceding the cycle in which decode is performed. The ModR/M table 26 of FIG. 6 contains the addressing mode information and indicates if the particular instruction requires a memory access.

Also, the ModR/M table 26 of FIG. 6 indicates if the instruction includes the scaled index base (SIB) form of addressing mode. In the case that it exists, the SIB byte 58 extracted from the byte extractor 22 of FIG. 6 is validated and the SIB table address 86 provides an entry into a tertiary table called the SIB table 28 of FIG. 6 discussed above. The three tables 24, 26, 28, together provide the instruction length, the addressing mode, the source and destination registers and other information directly.

Figure 8:
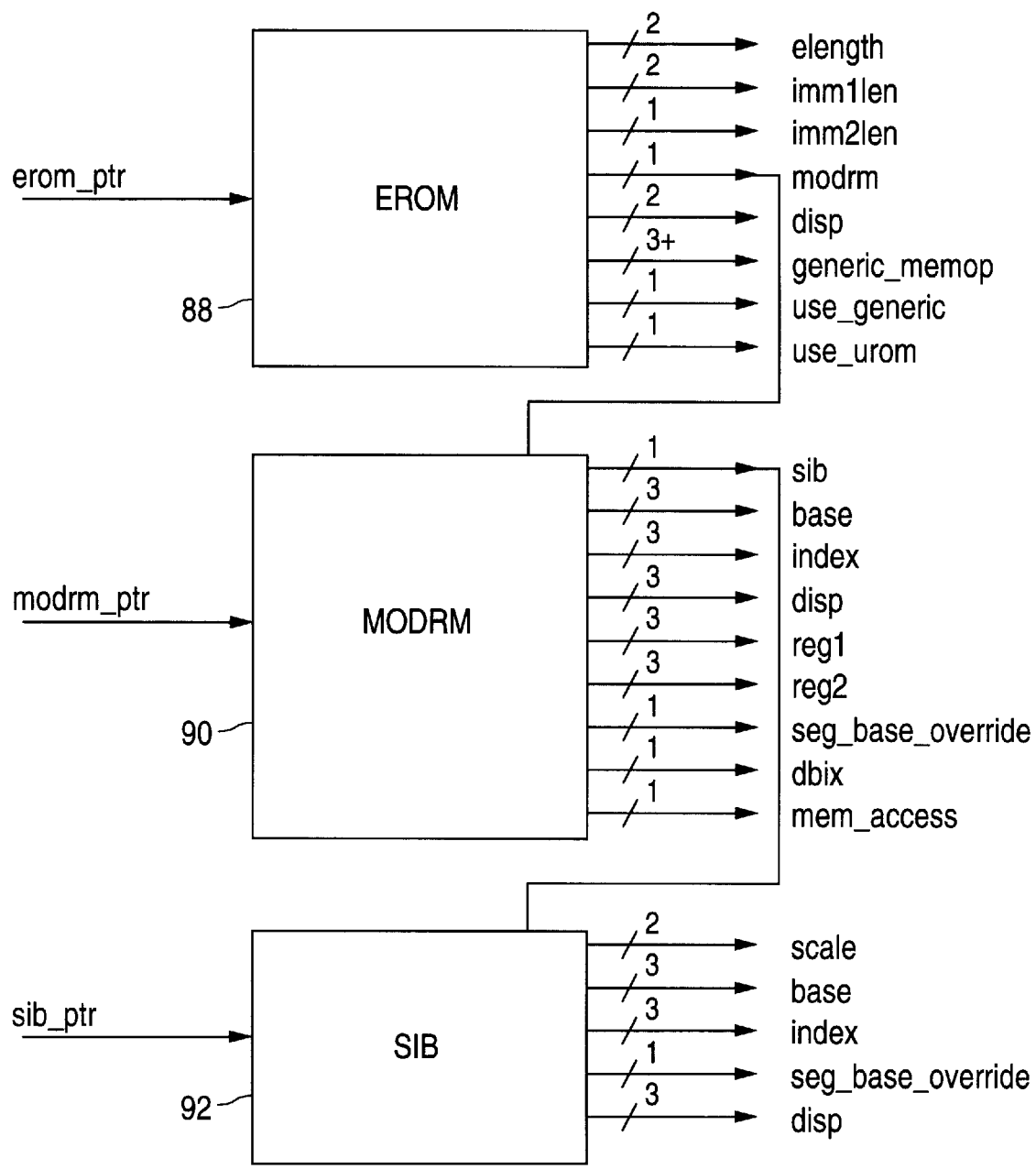
FIG. 8 is a block diagram depicting the outputs and linkage of the eROM, ModR/M and SIB tables of the decoder of the present invention.

Turning to FIG. 8, the specific infobits generated by the Programmable Logic Arrays (PLAs) implementing the eROM table 88, the ModR/M table 90, and the SIB table 92 are shown. The one bit validation signals, modrm and sib, are drawn connected to the PLAs whose table address they validate to indicate the relationship and linkage between the tables. The elength signal, the imm1len signal, and the imm2len signal indicate the lengths in bytes of the various corresponding operands. The two bit wide disp signal combined with the disp signals of the ModR/M and SIB PLAs indicates how long the displacement is in bytes. The three or more bit wide signal labeled generic-memop are used to dynamically generate the variable part of the generic instruction in the generic ROM 32 of FIG. 6.

The use_generic bit signal specifies when the generic ROM 32 of FIG. 6 is selected so the generic instruction assembled there is used. This signal is activated for almost all opcodes (with a small number of exceptions) whose operands can be in either a register or RAM. For example, opcodes like BTC, BTR, INC, and LLDT can use either register or memory operands. As indicated above, the useirom signal is a one bit signal that specifies that the microinstruction for ROM entry 40 output by the μROM 30 is to be used versus the output of the eROM 24.

As with the disp signals described above, the base signals of the ModR/M 90 and SIB 92 PLAs combined and the two index signals of the ModR/M 90 and SIB 92 PLAs combined indicate the length in bytes of the base and index respectively. The reg1 and reg2 signals indicate the length of register operands. The seg_base_override signals of the ModR/M 90 and SIB 92 PLAs combined indicates whether there is a segment base override. The dbix signal indicates whether the instruction addressing mode is using the base plus index form of addressing. The mem_access signal indicates if the instruction involves a memory access. Finally, the scale signal indicates the length of the scaling factor of the index.

The behavior of instructions that use memory operands versus those that use register operands is different. However, for most of the instructions that use memory operands, the difference is only in the first microinstruction to be executed. In other words, all but a few bits of the microinstruction are frequently the same. The decoder of the present invention takes advantage of this characteristic of microprocessor instruction sets. The Intel x86 instruction set of the preferred embodiment is particularly suited to taking advantage of this characteristic. Referring again to FIG. 6, by using a wide generic ROM 32 to store a single "generic" microinstruction for the ROM entry register 40, a preferred embodiment of the present invention "shares" microinstructions whenever possible. Thus, a single generic microinstruction stored in a ROM 32 makes efficient use of the similarity in the behavior (or bit patterns) of the instructions that use memory operands. In other words, use of this generic ROM 32 to provide the microinstruction to the ROM entry register 40 allows the sharing of a microinstruction by all of the instructions that use memory operands.

The contents of the generic ROM 32 are immediately selected by the output of the eROM table 24 and the selection logic 34. Specifically, use of the generic ROM 32 is controlled by the "use_generic" bit in the eROM table 24. This avoids redundancy and saves microcode space.

As mentioned above, many memory based instructions behave similarly. To provide for those that do not, both the eROM 24 and μROM 30 are accessed simultaneously. Based upon the information bits generated out of the eROM table 24, only the microinstruction for ROM entry 40 output by the eROM table 24 or the output of the FROM 30 is selected. Also, a low infobit "use_generic" signal out of the eROM table 24 indicates when the generic microinstruction cannot be used. This feature covers the rest of the instructions which do not have similar behavior in the case of the memory operand. Thus, the complete behavior for every instruction of the instruction set can be fine tuned for maximum performance and faster and efficient decode of the instruction. It is important to note that this faster and more efficient decode of the instruction is possible only by using the predecoded information in the eROM 24 and ModR/M 26 tables in conjunction with exploiting the similarities or redundancies in the instruction set's bit patterns and creating a generic microinstruction stored in the generic ROM 32.

As described above, the generic microinstruction stored in the generic ROM 32 allows sharing of a microinstruction between instructions which use memory operands. To apply this concept to the entire instruction set, and not just those that use memory operands, would require several different versions of the generic microinstruction and additional hardware to select the particular version appropriate for the current instruction type. Such a solution would defeat the purpose of the generic microinstruction and eliminate the benefits of using only a single generic microinstruction. Further, if multiple versions of the generic microinstruction were to be implemented, they would differ by only one field. The solution of one of the preferred embodiments is to use a "dynamic" generic microinstruction.

A "dynamic" generic microinstruction is able to handle almost all of the instructions in the microprocessor instruction set by using the infobits called "generic_memop" out of the eROM table 24 to determine the correct bit pattern for the one different field. Faster access is enabled by having only one entry in the generic ROM. Thus, the generic microinstruction is generated dynamically using the information from the Entry ROM 24.

As described above, the opcode of an instruction points to an entry point in the eROM 24. This eROM table 24 not only consists of the first microinstruction to be executed, but also the predecoded information about the opcode. In other words, the eROM table 24 includes a list of all of the possible first microinstructions and predecoded information about each opcode. Included in this predecoded information is the "use_generic" bit which controls the use of the generic ROM 32 and its dynamic generation of a microinstruction for the ROM entry 40. As explained above, the use_generic bit signal specifies when the generic ROM 32 is selected so the generic instruction assembled there is used. This signal is activated for almost all opcodes (with a small number of exceptions) whose operands can be in either a register or RAM. For example, opcodes like BTC, BTR, INC, and LLDT can use either register or memory operands.

Though some memory operand instructions behave similarly to the register operand instructions, some do not. To maximize performance of the decode for these type of instructions, split μROM access is used. Split GROM access means that both ROMs, the μROM 30 and the eROM 24, are accessed simultaneously by the same address. The relevant ROM is selected using the an infobit from the eROM 24. More specifically, the eROM table 24 can generate a bit signal called "use_μROM" which is used to select either the μROM 30 or the eROM 24 ROM entry 40. This feature allows scaling of the system in that multiple pairs of μROMs 30 and eROMs 24 can be added to increase performance through parallel processing. The infobits are added with no extra cost to the system and they enable the faster decode described above which results in more efficiency.

Figure 9:
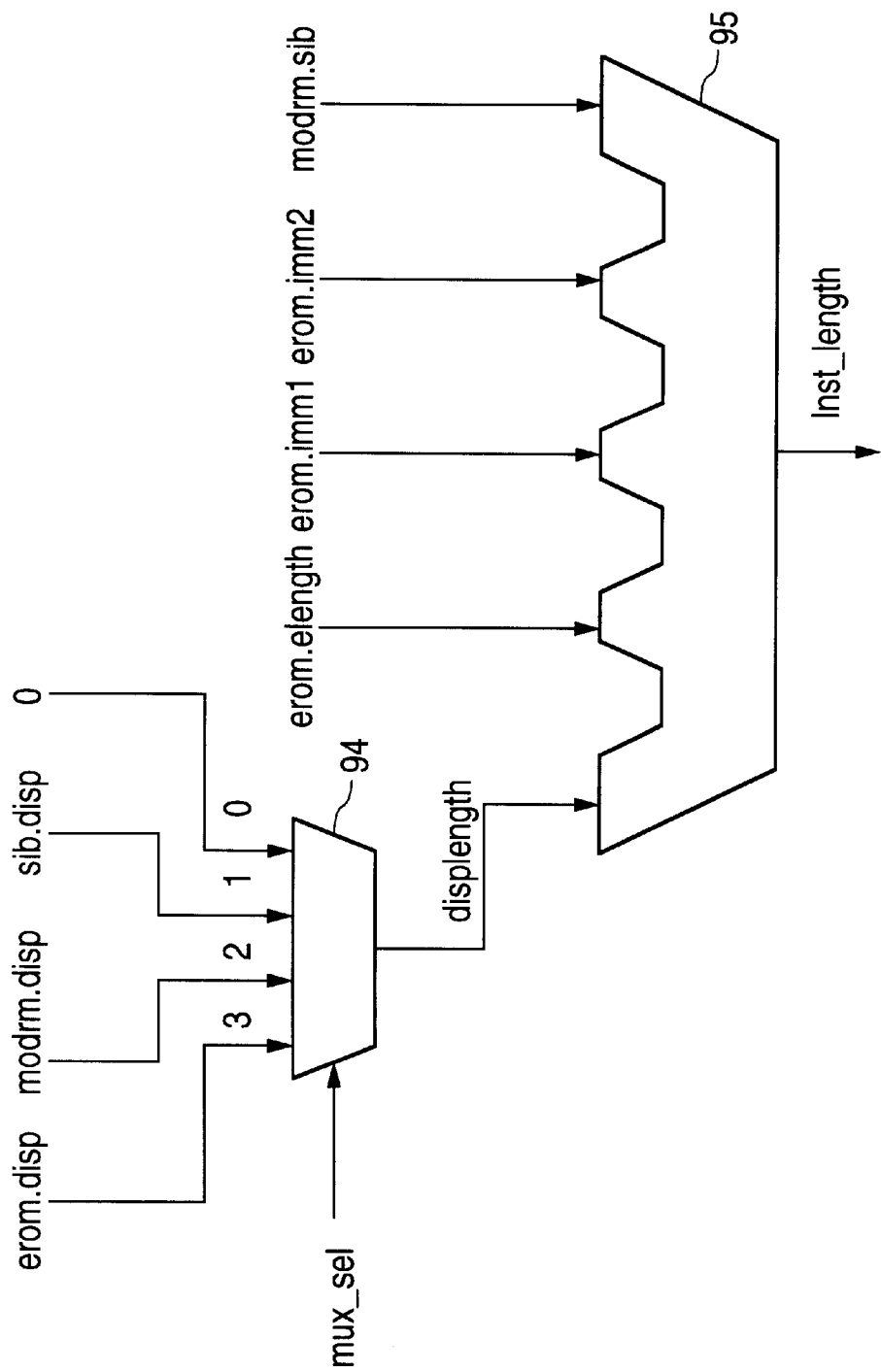
FIG. 9 is a detailed diagram of the size logic used in the decoder of the present invention.

Referring now to FIG. 9, the logic represented by the size logic 36 block in FIG. 6 for calculating the total instruction length is described in detail. The instruction length is given by Σ(erom.elength, modrm.sib, displength, erom.imm1len, erom.imm2len) where displength is equal to either the eROM disp, the ModR/M disp, the SIB disp or Zero; chosen based upon the existence and type of displacement within the decoded instruction. Thus, adder 95 takes the elength, imm1len, and imm2len signals from the eROM 88 of FIG. 8, the sib signal from the ModR/M table 90 of FIG. 8, and sums them with the output of mux 94 which is the length of the appropriate displacement. The appropriate displacement is selected based upon the following logic equations which can be implemented in the standard manner.

If (erom.modrm && modrm.sib) then mux_sel=1;

If (erom.modrm && !modrm.sib) then mux_sel=2;

If (erom.disp) then mux_sel=3; and

Else mux_sel=0

The output of this logic, mux_sel, is used to select the appropriate disp signal to feed the adder 95.

Figure 10:
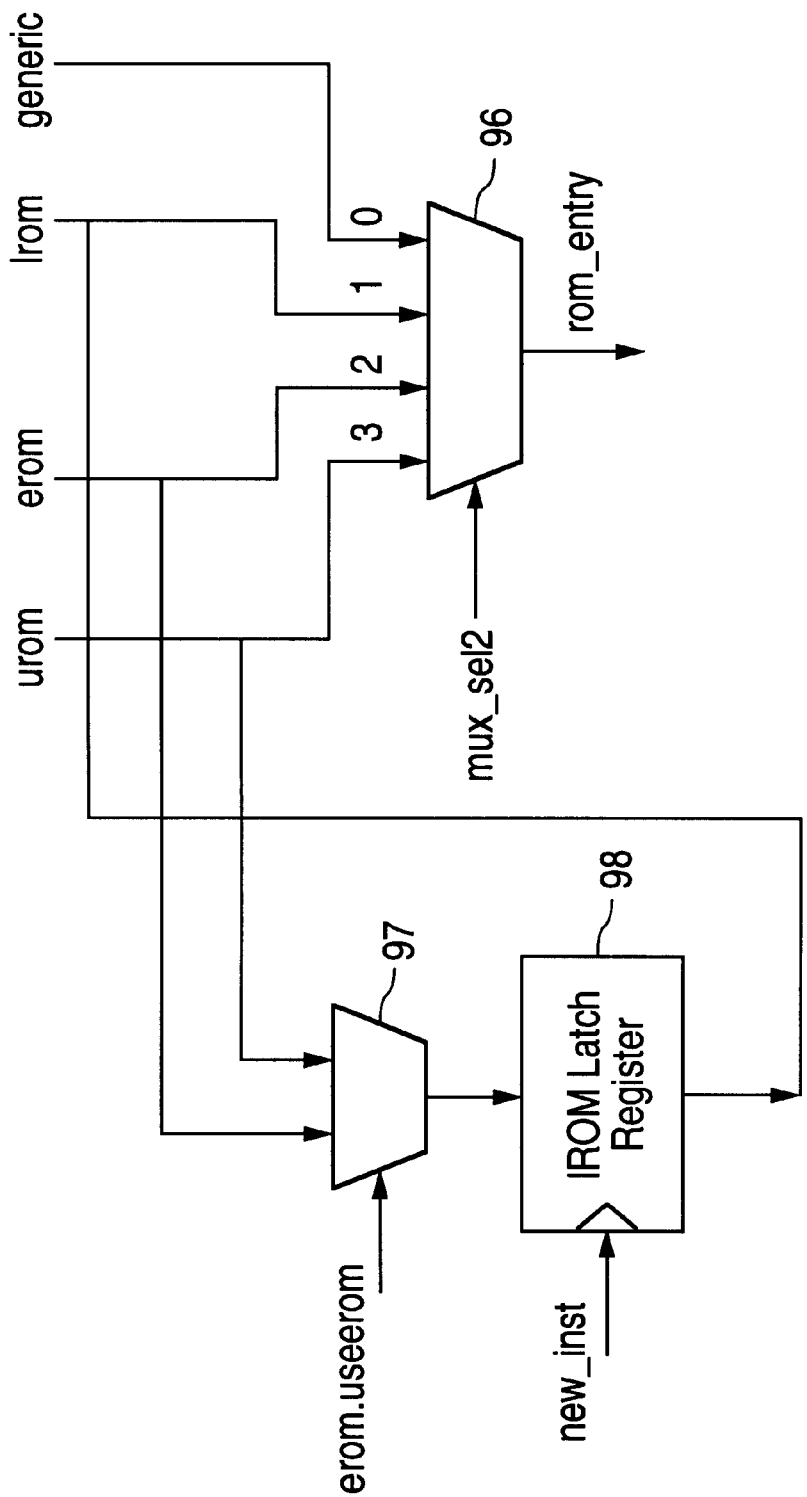
FIG. 10 is a detailed diagram of the ROM entry selection used in the decoder of the present invention.

Turning now to FIG. 10, the selection logic 34 block of FIG. 6 for selecting the appropriate microinstruction for the ROM entry 40 will now be described. The selection logic includes a mux 96 driven by the following logic rules which can be implemented in the standard manner.

If (modrm.memaccess && erom.use_generic) then mux_sel2=0, use_lrom=1;

If (use_lrom) then mux_sel2 1;

If (use_erom) then mux_sel2 2; and

Else mux_sel2=3

The mux_sel2 logic equations above are used to choose between the outputs of the μROM 30, the eROM 24, the Latch Register (lROM) 98, and the generic ROM 32. The use_erom signal, which is equivalent to !use_urom, is used to select between the outputs of the μROM 30 and the eROM 24 to feed the lROM 98. As can be seen from the above mux_sel2 equations, if the generic ROM 32 is selected, the lROM 98 will be used in the very next cycle. Thus, this latching of the μROM 30 or eROM 24 output enables the first microinstruction to be available after a generic microinstruction is used. Without the latch, the first microinstruction of the next instruction would instead be used with the generic microinstruction, causing the decoder to get out of synchronization.

Turning now to FIG. 11, an example of how the ROM entry 40 is generated in a prior art decoder is contrasted with the same function in the decoder of the present invention using the generic instruction to clearly distinguish the benefits of the generic instruction. As shown in FIG. 11, prior art decoders require two different microcode entries for a simple add instruction. The first is for instructions involving register operands and the second is for those with memory operands.

In the decoder of the present invention, if an add instruction involves memory, the new decoder first performs a load and then it performs the addition. The eROM table 24 indicates to the decoder that the generic microinstruction should be used for the load by asserting the use_generic signal. This is an example of the use of a generic instruction. A memory load is performed first and then the addition is performed. The difference between an add performed with a prior art microprocessor and an add performed with the decoder of the present invention is that instead of using register1 and register2 to hold the operands, register1 and register2/temp are used depending on the mem_access signal from the ModR/M table 90. The present invention takes advantage of the fact that an add is essentially the same instruction no matter where the operands are stored. Thus, with the generic microinstruction, the same microinstruction can be used for both cases.

Various other modifications and alterations in the structure and method of operation of this invention will be apparent to those skilled in the art without departing from the scope and spirit of the invention. In particular, the invention can be implemented in other processors than the example one described herein. Additionally, the invention can be applied to any number of different instruction sets.

Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a decoder for decoding an instruction in a processor having an instruction set and for providing a microcode to a sequencer, the apparatus comprising:
   a buffer for storing an instruction and associated operands to be decoded;
   an extraction circuit for reading portions of the instruction from the buffer;
   at least one read-only memory storing instruction decode tables, the at least one read-only memory coupled to the extraction circuit to receive the portions of the instruction and in response generate a plurality of output signals including a microcode output signal, an information bits output signal, and an output signal indicating an existence of an addressing mode specifier; and
   a selection circuit including
      data inputs coupled to the microcode output signal of the at least one read-only memory,
      control inputs coupled to the information bits output signal of the at least one read-only memory, and
      a selected output coupled to a sequencer.

2. An apparatus including a decoder for decoding an instruction in a processor having an instruction set and for providing a microcode to a sequencer, the apparatus comprising:
   a buffer for storing an instruction and associated operands to be decoded;
   an extraction circuit for reading portions of the instruction from the buffer;
   at least one read-only memory storing instruction decode tables, the at least one read-only memory coupled to the extraction circuit to receive the portions of the instruction and in response generate a plurality of output signals including a microcode output signal, an information bits output signal, and an output signal indicating an existence of an addressing mode specifier;
   a selection circuit including
      data inputs coupled to the microcode output signal of the at least one read-only memory,
      control inputs coupled to the information bits output signal of the at least one read-only memory, and
      a selected output coupled to a sequencer; and
   a microcode ROM having an input and an output and including a microcode for each instruction of the processor, wherein the input is coupled to the extraction circuit to receive the portions of the instruction concurrently with the at least one read-only memory and in response execute the microcode for the instruction to be decoded,
   wherein the selection circuit further includes a second additional data input, and
   wherein the output of the microcode ROM is coupled to the second additional data input of the selection logic circuit.

3. The apparatus of claim 2 further comprising:
   a latch register having an output and an input, wherein the input is selectively coupled to
      the microcode output signal of the at least one read-only memory, and
      the output of the microcode ROM,
      wherein the plurality of output signals from the at least one read-only memory specify a first set of information about the instruction being decoded and control which of the microcode output signal of the at least one read-only memory and the output of the microcode ROM is selected,
   wherein the selection circuit further includes a third additional data input, and
   wherein the output of the latch register is coupled to the third additional data input of the selection circuit.

4. An apparatus including a decoder for decoding an instruction in a processor having an instruction set and for providing a microcode to a sequencer, the apparatus comprising:
   a first circuit for receiving an instruction and one or more associated operands to be decoded;
   a second circuit operatively coupled to the first circuit to read portions of the instruction;
   a first memory having a bit width equal to an input bit width of a sequencer and operative to store and output a predetermined bit pattern determined based on the instruction set of the processor;
   one or more second memories, each having entries for instructions, each operatively coupled to the second circuit to receive the portions of the instruction, and each operative to generate a plurality of output signals based on the portions of the instruction, wherein the plurality of output signals include:
      a first signal representative of a microcode for a sequencer;
      a second signal representative of information about the instruction being decoded; and
      a third signal indicating an existence of an addressing mode specifier in the instruction; and
   a selection circuit operatively coupled to the first memory and the one or more second memories, for selecting a signal to be input to the sequencer based on the second signal, the selection circuit operative to select from among the predetermined bit pattern output by the first memory and the first signal output by the one or more second memories.

5. The apparatus of claim 4 wherein the predetermined bit pattern of the first memory is a bit pattern common to a substantial subset of the instructions of the processor.

6. The apparatus of claim 4 wherein the predetermined bit pattern of the first memory is a bit pattern common to those instructions of the processor that perform operations using operands stored in processor memory.

7. The apparatus of claim 4 wherein the predetermined bit pattern of the first memory is a bit pattern common to those instructions of the processor that perform operations using operands stored in processor registers.

8. The apparatus of claim 4 wherein the predetermined bit pattern of the first memory is a bit pattern common to a substantial subset of those instructions of the processor that perform operations using operands stored in processor memory.

9. An apparatus including a decoder for decoding an instruction in a processor having an instruction set and for providing a microcode to a sequencer, the apparatus comprising:

a buffer for storing an instruction and associated operands to be decoded;

an extraction circuit for reading portions of the instruction from the buffer;

at least one read-only memory storing instruction decode tables, the at least one read-only memory coupled to the extraction circuit to receive the portions of the instruction and in response generate a plurality of output signals including a microcode output signal, an information bits output signal, and an output signal indicating an existence of an addressing mode specifier;

a selection circuit including
  data inputs coupled to the microcode output signal of the at least one read-only memory,
  control inputs coupled to the information bits output signal of the at least one read-only memory, and
  a selected output coupled to a sequencer; and a register having an output and including a predetermined bit pattern determined from the instruction set of the processor;

wherein the selection circuit further includes a first additional data input, and wherein the output of the register is connected to the first additional data input of the selection logic circuit.

10. The apparatus of claim 9 wherein the predetermined bit pattern is common to a substantial subset of the instructions of the processor.

11. An apparatus including a decoder for decoding instructions in a processor and providing a microcode to a sequencer comprising:

a buffer for storing an instruction to be decoded and one or more associated operands;

an extractor circuit operatively connected to the buffer to read portions of the instruction from the buffer;

a first memory operatively connected to the extractor circuit to receive a first plurality of the portions of the instruction and having entries for different instructions and a first plurality of output signals specifying
  a microcode bit pattern,
  a first set of information about the instruction being decoded, and
  an existence of a primary addressing mode specifier in the instruction;

a second memory operatively coupled to the first memory output signal specifying the existence of the primary addressing mode specifier in the instruction and operatively coupled to the extractor circuit in parallel with the first memory, to receive a second plurality of the portions of the instruction, and wherein the second memory includes a second plurality of output signals specifying a second set of information about the instruction and an existence of a secondary addressing mode specifier in the instruction;

a third memory operatively connected to the second memory output signal specifying the existence of the secondary addressing mode specifier in the instruction and operatively connected to the extractor circuit in parallel with the first memory and the second memory, to receive a third plurality of the portions of the instruction, and wherein the third memory includes a third plurality of output signals specifying a third set of information about the instruction;

a selection logic circuit having an output operatively coupled to a sequencer and a plurality of microcode bit pattern inputs wherein a first microcode bit pattern input is connected to the microcode bit pattern output of the first memory and the selection logic circuit is operative to select one microcode bit pattern from among the plurality of microcode bit pattern inputs;

a generic ROM including a bit pattern common to a subset of the instructions and having an output connected to a second microcode bit pattern input of the plurality of microcode bit pattern inputs of the selection logic circuit;

a microcode ROM including a microcode for each instruction of the processor and having an output connected to a third microcode bit pattern input of the plurality of microcode bit pattern inputs of the selection logic circuit;

a latch register having an output connected to a fourth microcode bit pattern input of the plurality of microcode bit pattern inputs of the selection logic circuit and an input selectively connected to the microcode bit pattern output of the first memory and the output of the microcode ROM wherein the output signal from the first memory specifying the first set of information about the instruction being decoded controls which of the microcode bit pattern output of the first memory and
  the output of the microcode ROM, is selected; and a size logic circuit for calculating a length of the instruction, having a plurality of inputs operatively connected to the output signals of the first memory, the second memory, and the third memory.

* * * * *